US012780369B2

(12) United States Patent
Piermattei

(10) Patent No.: US 12,780,369 B2
(45) Date of Patent: Nov. 3, 2026

(54) IN-WATER BOAT WASH SYSTEM

(71) Applicant: EKG Witholdings LLC, Derry, NH (US)

(72) Inventor: Erik Piermattei, Derry, NH (US)

(73) Assignee: EKG Witholdings LLC, Derry, NH (US)

( * ) Notice: Subject to any disclaimer, the term of this patent is extended or adjusted under 35 U.S.C. 154(b) by 206 days.

(21) Appl. No.: 18/804,341

(22) Filed: Aug. 14, 2024

(65) Prior Publication Data

US 2025/0058859 A1 Feb. 20, 2025

Related U.S. Application Data

(60) Provisional application No. 63/519,602, filed on Aug. 15, 2023.

(51) Int. Cl.

| | |
|---|---|
| ***B63B 59/08*** | (2006.01) |
| ***B08B 1/12*** | (2024.01) |
| ***B08B 3/02*** | (2006.01) |
| ***B63B 1/12*** | (2006.01) |
| ***B63B 17/02*** | (2006.01) |
| ***B63B 25/12*** | (2006.01) |
| ***B63B 35/38*** | (2006.01) |
| ***B63B 79/10*** | (2020.01) |

(52) U.S. Cl.

CPC ................ *B63B 59/08* (2013.01); *B08B 1/12* (2024.01); *B08B 3/02* (2013.01); *B63B 1/121* (2013.01); *B63B 17/02* (2013.01); *B63B 25/12* (2013.01); *B63B 35/38* (2013.01); *B63B 79/10* (2020.01)

(58) Field of Classification Search

CPC ......... B63B 59/08; B63B 79/10; B63B 1/121; B63B 17/02; B63B 25/12; B63B 35/38; B08B 1/12; B08B 3/02

See application file for complete search history.

(56) References Cited

U.S. PATENT DOCUMENTS

| | | | | |
|---|---|---|---|---|
| 3,227,124 A * | 1/1966 | Campbell | B63B 59/08 | 15/88.4 |
| 3,800,732 A * | 4/1974 | Hill | B63B 59/08 | 15/53.2 |
| 2008/0011216 A1* | 1/2008 | Van-Zwol | B63B 59/10 | 114/343 |
| 2011/0048309 A1* | 3/2011 | Al-Rujaib | B63B 59/04 | 114/222 |

FOREIGN PATENT DOCUMENTS

WO WO-2018021957 A1 * 2/2018 ............. B63B 59/08

* cited by examiner

*Primary Examiner* — Stephen P Avila

(74) *Attorney, Agent, or Firm* — Secant IP, P.L.L.C.

(57) ABSTRACT

An in-water boat wash system includes pontoons constructed to float in a body of water in a spaced apart arrangement. A frame is attached to the pontoons such that the frame extends down and away from the pontoon into the body of water when in use. A tank is attached to or supported by the frame. A brush assembly is attached to the pontoon such that the brush assembly extends away from the pontoon into the body of water, the brush assembly shaped to clean the exterior of a boat. A nozzle assembly is attached to the pontoons such that the nozzle assembly extends away from the pontoon into the body of water, the nozzle assembly shaped to clean the exterior of the boat.

19 Claims, 7 Drawing Sheets

IN-WATER BOAT WASH SYSTEM

This application claims priority to U.S. Provisional Patent Application Ser. No. 63/519,602, filed on Aug. 15, 2023, and entitled "IN-WATER BOAT WASH SYSTEM."

TECHNICAL FIELD

The present disclosure relates generally to wash systems for vehicles and more particularly to an in-water boat wash system.

BACKGROUND

When a boat is used is a body of water, fouling typically begins to form on the exterior of the boat. Fouling occurs when organic particles in the water such as bacteria or plant matter accumulate on the exterior of the boat. A user will typically clean the exterior by hand which can be time consuming and difficult. If left uncleaned, fouling can progress to a point where it is difficult to remove by hand and often requires pressure washing to remove.

SUMMARY

Disclosed is an in-water boat wash system. The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the disclosed subject matter.

In one embodiment, the in-water boat wash system can be useful to eliminate milfoil from boats. One such system has two pontoons of rectangular shape. The pontoons can be sized to support a 20', 30', 40' version, a 55' ft version, and a 70' ft version of the boat wash. In one embodiment, the boat-wash system is fully automated and can be operated using a RFID system and self-pay kiosk which will also consist of a blue tooth connectable system so a captain, crew, and passengers can remain in the vessel throughout system operations while the boat is being washed.

In one embodiment, the pontoons are made of aluminum, steel or polypropylene and have a size of four foot in width, four foot in height, and lengths of forty feet, fifty-five feet, and seventy feet, for example. The pontoons can be rectangular shaped with a forty-five degree bow and stern angle with all welded seams. The bottom of pontoons can be made into a v shape and or have a flat bottom. Brackets can be attached to the pontoons, such as by welding, and spaced every 8 feet on center on the bottom and sides. For example, one pontoon has brackets on starboard side and the other pontoon has brackets on the port side such that both pontoons will have brackets on bottom. The pontoon interior can have a welded deck or partition located about two feet down from bottom and or top. This deck defines a sealed air chamber for floatation, that will also hold waste tanks on some versions, The bow and stern may also have sprayed-in flotation and or sealed chambers that will hold compressed air for operation of the pneumatic systems as well.

Above the two-foot lower deck that defines the chamber is an upper space of the pontoon. This upper space is a storage chamber configured to hold equipment of the boat wash system. For example, the storage chamber has an aluminum, steal, or polypropylene deck with water-tight hatches to enable access to equipment stored inside the pontoon. The deck of the pontoons will have railings on the sides that are on the outer edges, both starboard and port, as well as stern and bow, that will be four foot in height. The railings can have circular brackets to hold posts that will be removable to support a roof structure. In one example, the roof structure can be eight feet off of deck on exterior sides that are bent to a 45-degree angle. Optionally, the roof structure can be used to support a solar panel system used to power, at least in part, the wash system. In one example, solar battery banks with inverter can be held in one pontoon and the other pontoon will hold the washing hydraulic equipment with power distribution panels. The pontoons can also be charged with shore power hookups and can also be able to run using shore power connections by means of NFPA 72 connections.

The pontoons can be connected to a frame made of extruded aluminum beams six inches by six inches on smaller models and eight inches by eight inches on larger models. Other materials can be used as well like steal or polypropylene that can withstand the structural integrity, In one example, each pontoon curves at an angle from forty-five to twenty-five degrees. The pontoons connect to one another in the middle with fabricated brackets that wrap a center beam that is the same length of the pontoons. Shaped extruded aluminum beams, depending on size a machine, will be set at 6-foot intervals, 8-foot intervals, or 10-foot intervals. The extruded beams will be curved into a U-shape that extends below and connects the pontoons. In some embodiments, these beams can define passageways for wiring, such as an opening or channel near the center of the beam. Such wiring channels can be used to interconnect the power wires and low voltage communication wires. Theses beams will also hold the underwater tank which will be built with aluminum panels in some versions as well as a one-piece polymer tank that is referred to as the debris tank.

The debris tank will be a complete sealed tank that sits above water line and extends all the way down to the bottom of the machine. In one embodiment, the system includes hydraulic and/or pneumatic-operated gates at each end of the boat wash, such as one defining an entrance and at the opposite end defining an exit. The gates, depending on the environment, will either be set at a 45-degree angle for bow and stern or a flat vertical ninety-degree angle between the debris tank floor and the end of pontoon. Those gates will fold into the machine on the vertical rise and be controlled with pneumatic or hydrologic actuators. The gates will operate open and closed with hinges on sides of debris tank and seam together in the middle with a rubber seal system. The depth of the debris tank can be selected as appropriate for a given application, such as from a six-foot draft all the way to a twenty-foot draft depending on model.

Upon approaching the machine with the vessel to be washed, an RFID reader is triggered to open the front gate. Alternately, or additionally, the user can open the gate using a mobile app configured to allow the front gate to open. Then a sensor on the stern of the pontoons will signal to the user to indicate that it is clear to enter. For example, the signal illuminates "OK", "please drive forward," or "please enter," along with a green flashing beacon. Embodiments equipped with a light package can be configured so that the lights illuminate in green as well. The system can be configured to signal to the user that it is ready to approach and be entered once the vessel has cleared the safety sonar sensors, and safety sensors, The rear stern gate will begin to close as the vessel enters the debris tank.

At the stern of the pontoons will be a sonar sensing device which will measure the length and width of the vessel as the vessel drifts into position. It will also measure where the vessel is located in comparison to the center of the debris chamber. There will be bumpers surrounding the interior of the hulls on the machine to protect the entering vessel, there will be two actuators at the bow and stern of the vessel to control an arm that will swing out from the sides of the pontoons with a rubber foam pad, cloth pad or neoprene pad, coated with a soft cloth pad and pressure sensors. The arm will swing out and secure the vessel in place once the safety checks have been satisfied and the vessel is secured. The underwater brushes as well as freeboard brushes and high-pressure jets will start the cleaning process. As the cleaning process begins the water filtration system will begin the debris chamber will have three 16-inch diameter drain ports on the bottom of the tank and four 8-inch by 24-inch supply ports or recycled water ports on the water line of the debris tank.

When the selected wash cycle begins, a water filtration system or skid will start to process the water by sucking water from the lower ports and circulating through the filtration system. At this time the herbicide approved for the body of water the embodiment sits in will be injected into the processed water and will then go back into the chamber to the upper ports. In one embodiment, water is processed at a filtration rate of 30,000 gallons per minute through a remote filtration skid or onboard filtration system, and back into the chamber.

In one embodiment, filtering the water includes pulling processed water through a 5-micron osmosis filtration system to remove any debris and or contaminants that are within the debris tank. Water filtration system will operate for one minute after brushes have completed scrubbing the bottom of vessel. When the water filtration system stops, a flow sensor that is satisfied will then allow the captain to make the next selection. To use the deck side power washer, and or vacuum that will be affixed to the deck of the pontoons. After receiving the selection, the controller will act upon selection, once all selections have timed out and the wash, power wash, vacuum, have been shut down there will be a warning signal emitted letting the captain know that the actuators are about to release the arms will then release the vessel, allowing the captain to drive the vessel forward. In one example, the system includes a menu board with a series of lights arranged to direct the captain to position the boat properly. Once the vessel has cleared the exit eyes located at the front of the chamber, the gate will begin to close, and the water filtration system will go on a very low circulation mode injecting herbicide and or pesticide the body of water appropriates for in order to clean the invasive species that the EPA has a regulation on and is trying to stop the growth of until the next vessel approaches.

The water filtration skid can either be an on-board model or a remote-located model that is configured to handle a high flow rate, from 20,000 gallons up to 160,000 gallons of water per boat, depending on the size of the tank. A filtration system will filter particles greater than 5 microns from the wash water, then will recirculate the filtered water back to the tank. The discharged dirty water will go into an onboard holding tank to be pumped out by a certified pump-out vessel or will go into a containment tank to be pumped out by a commercial sewage company located off site to wherever the destination is to dispose of it. For example, the disposal site may be at the marina or a location where the system is placed. The disposal site may have a marine pump-out station, such that the discharge will be able to be disposed of at the pump-out station in these locations. The skid will consist of an oil separator tank built into the water filtration skid.

A sensor assembly can be included. For example, safety sensors can include infrared safety beams that are set six inches below the pontoon deck, for example. This sensor assembly will create a safety grid that at any point of breach shuts down the machine immediately. For example, in case a small child or animal happens to fall off the vessel, the sensors are triggered, and the machine shuts down. In one embodiment, the rotating brushes will stop and the machine can be manually reset by a button located on the stern of each pontoon. For example, pressing the button will bring the machine back to the bow of the boat and restart the wash cycle. Ultrasonic sensors can be used to verify boat is still in the desired position. Above the reset buttons located at the stern, a manual emergency stop button can be provided and located in the bow, mid ship, and stern of each pontoon. Pressing any of the stop buttons opens a circuit (off position) such that restarting the system will require the pressed button to be reset, at which point the machine will go back into its restarting position and will need another wash package to load prior to restarting. The downloadable app will also have an emergency stop that pops up while the wash is in progress so the captain is able to stop the wash from there device app.

Once the wash cycle has completed, the system will prompt the user to select yes or no to use the deck-top pressure washer located on the bow of the pontoons. If the captain selects yes, then the vessel will remain in place with the retaining arms until five minutes after the power washer shutdown completes. A warning signal will be emitted during this process before the actuator arms will start to release as the bow gate opens, allowing the vessel to continue forward. The bottom brushes will also drop down at a 45-degree angle allowing the engine to clear the brushes. Once the entrance eye is clear for a 5-minute period the gate on the bow will close and the machine will go into idle mode while it waits to receive the next wash command to start.

Studies has shown that a boat wash system as disclosed herein has a positive impact on aquatic life. Many versions of this system will be able to positively impact EPA struggles with invasive species as the wash system will also have an injection system to be able to inject a herbicide, pesticide, or any powder or water-based chemical approved for use at the body of water being treated. For example, the local EPA jurisdiction will be able to regulate these treatments as needed. In addition, a boat wash system as disclosed herein can be useful to aid in controlling growth of certain invasive species, such as reducing milfoil seaweed extra. Most marine-based bottom paints have very harsh chemicals within them such as copper, and magnesium. The boat wash system can clean the bottoms of vessels without the need for marine grade bottom paint and is able to keep the original gel coat surface on fiberglass (or any original surface), which in return allows reduced resistance against the water and ultimately making the vessel more efficient.

In some embodiments, the water filtration system has three main suction drains at the bottom of the tank. Circulated water then passes through a reverse-osmosis system at a rate of 10,000 GPM and discharges back into a holding tank that is two feet below the water line. The filtration system is capable of removing contaminants with a size of 5 microns or greater. In some embodiments, the wastewater discharge can be emptied into a sewage system or leach field after traveling through an oil/water separator.

Oscillating side blasters operate at approximately 275 psi at the rear of the machine to be able to perform more affective cleaning at the stern of the boat. The oscillating side blasters are particularly useful for pod drives and full shaft drives.

In one embodiment, the system has a drive-through tank basin that has a gate at the front (water side) of the tank. The rear (boat-ramp side) of the collection tank can used on a public boat ramp as a mandatory transfer of lakes and ponds. This would also act as a off-season storage option for the wash system.

In some embodiments, the system includes a self-pay kiosk for 24/7 locations and allows boat owners to be able to drive in and wash the boat themselves.

In some embodiments, the system includes safety sensors below deck level, such as a gate to disable the wash in the event that a child, operator, or pet falls into the tank.

In some embodiments, slide-out bumper rails are provided and serve two purposes. Since the bumpers retract, they become a safety fence on the side of piers or docks. When extended, the bumpers can hold the hull in place for a better scrub with the brushes. Since the slide-out bumper rails can center the boat in the wash basin, the bumpers can speed up the wash cycle as there would be no need to try to center the boat, particularly for a deep-fin keel sailboat or a center-shaft drive power boat.

In some embodiments, the system includes a lighting package that includes automated lights above the water line attached to the bottom of the side docks with lights shining down into the water for the light effect. A low voltage multi color pool light can be attached to the lower tank sides as well as to the bottom of the tank. This would be an option for effect, however in a 24/7 unit it would also help the captain navigate into the wash system.

In some embodiments, the side bumper system includes a series of smaller softer side brushes to configured to clean the free board (side of the hull out of water) between the water level to deck of the boat. The side brushes can help clean the water scum line in a more effective manner.

In some embodiments, the system offers a choice of chemicals to the user. In some embodiments, chemicals are limited to certain biodegradable chemicals, such as soap. In some embodiments, additional filtration time is added to the wash cycle when chemicals are added. The additional cycle time can help lubricate the inner filtration system as well as dissolve some floating bio debris that floats with in the water not seen to the naked eye. In some embodiments, the system provides a spray-on carnauba-based product to the hull free board of the boat hull.

In some embodiments, the system includes self-lifting hydraulic pistons with structural bars on the bottom of the basin to give the system owner the ability to lift the basin entirely out of the water during cold months. The hydraulic pistons also can act as an anchor when the wash system is placed in the water, and can reduce wave effects on the machines.

In some embodiments, the system includes a small exterior railing on the outside of the dock to provide fall protection and to act as a billboard, where allowed.

In some embodiments, the system provides options for different style brushes, from soft to harsh based upon environmental conditions.

In some embodiments, the system includes heated de-icing rings on the exterior of the basin lower portion to prevent ice damage if the basin is to be raised out of the water and left in place. Heaters or de-icing rings can also be useful for on-ground storage of the system. In some embodiments, the de-icing rings comprise a strap-on system, are provided during installation of the basin, or when basin is being molded add a hollow tube in the pour for the heat strips to be pulled through so they could be removed and stored aside during the season and simply be put back in for the winter months.

In some embodiments, the system provides different structural options for the basin. For example, the system has varied structural thicknesses for different applications. For example, a dredging company can install concrete or pile drive side piers to accommodate water having a depth less than the 12 ft draft requirements. This would also give an option to make the system a permanent structure, such as by eliminating the surrounding docks and installing a poured stamped concrete patio around it with hydronic cooling tubes utilizing with the port water that already exists.

In some embodiments, the system includes integrated solar panels and battery banks making this product more green and also more appealing for a morning installation in a less stringent sea harbor.

In some embodiments, the boat wash system includes a pump-out station on a dock or on land so a customer can pump out a boat's holding tanks while the hull is being cleaned. This can be advantageous for municipalities, yacht clubs, and areas with numerous bodies of water. A pump-out station may also improve locations where the boat wash systems are installed based on collaborations with municipalities to pay for start-up costs.

In some embodiments, the system includes a single-phase to three-phase converter can be provided with the enclosure incorporated into the dock, giving the customer the opportunity to utilize the existing 50-amp shore power stations that are pre-existing so it would become a self-contained plug and play unit for existing conditions. For example, slide in the wash system on an existing double wide slip. Water filtration units could then be mounted on the interior walls with a containment tank strapped to the underside of the dock and a port for a septic pump truck to connect to it.

In some embodiments, the in-water boat wash system is configured to be registerable as a vessel according to US Coastguard standards. For example, the system floats on water due to the buoyancy of the pontoons and the system includes an outboard motor bracket that is configured to install an outboard motor or that includes an outboard motor.

In some embodiments, the system is configured as a shallow water option which would have a 7' total draft option strictly for boats with no fin keel. Such feature virtually eliminates the vertical down brushes and replaces them with a bottom roller. Such feature can eliminate the structural down members to accommodate a shorter draft version geared towards the market of smaller lakes and ponds where over 75% of the registered boats are small power boats. For boats between 12 feet to 25 feet in length, this option results in a reduced cost to build.

Pontoons can be 4 feet wide by 4 feet deep by 20-60 feet in length. Pontoons can be made of aluminum with angled bow and stern gates. In some embodiments, pontoons include solar panel decking. For example, the pontoons have lower portion sealed air chambers and upper portion will have compartment to house mechanical equipment as well as solar battery cells.

In some embodiments, the system is configured to mount to hydraulic legs that are adjustable to extend to the bottom of body of water, such as when used in shallow water to anchor the system. The hydraulic legs can give the machine the option to lift directly out of water or have casters that would attach to bottom of legs for a winter pullout launch ramp option.

In some embodiments, the system includes side railing will also give the owner or municipality the option to advertise to help with the running costs.

In some embodiments, the system includes side-wrap soft brushes with a diameter of 35" or larger.

Figure 1:
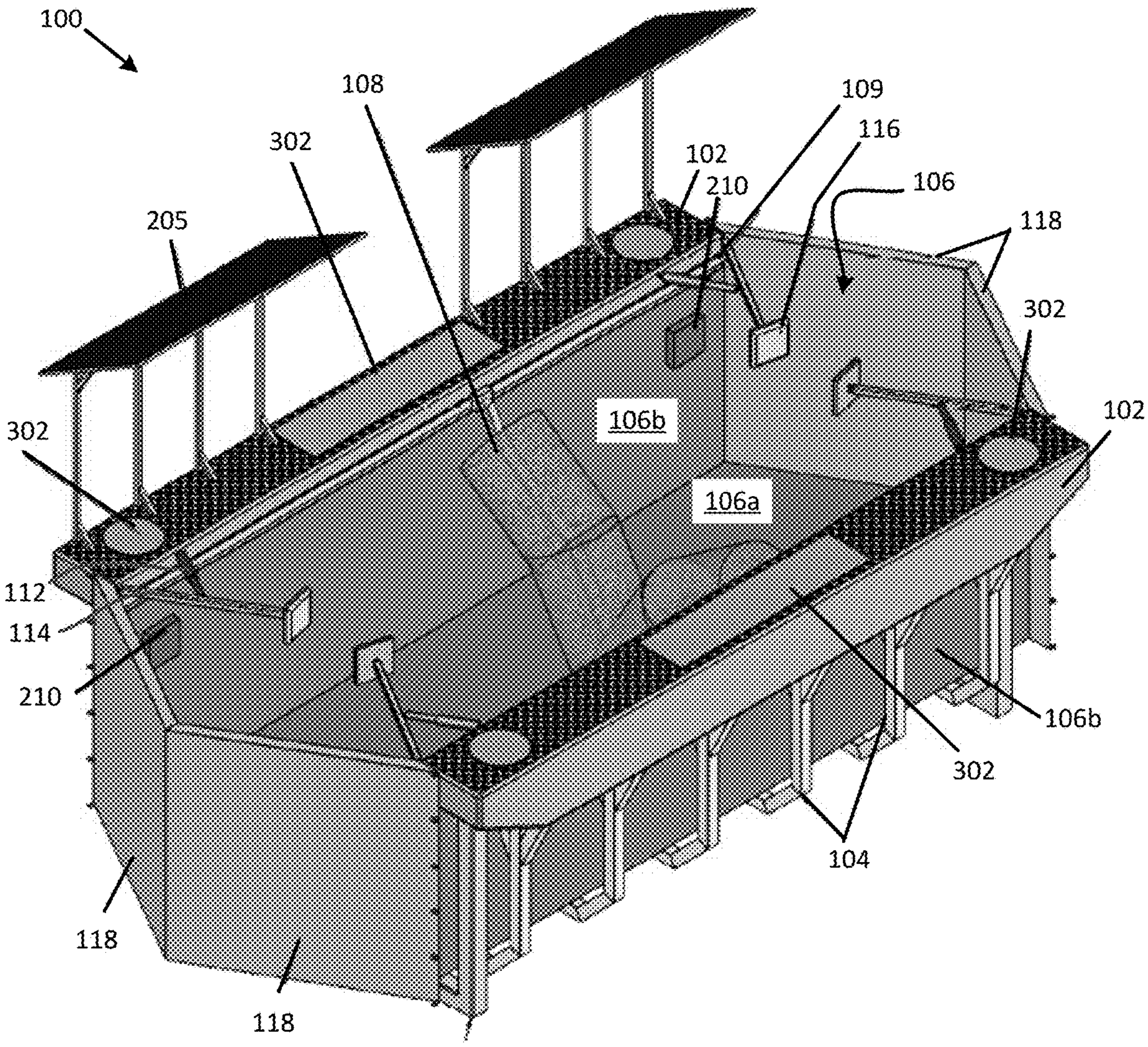
FIG. 1 is a perspective view of an in-water boat wash system, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

The present disclosure is directed to an in-water boat wash system and method of use. The system includes pontoons constructed to float in a body of water in a spaced-apart configuration. Each pontoon can include outer walls that define an inner space and a partition that divides the inner space into a first section and a second section. The second section can be configured to be filled with a buoyant substance, such as air or foam. A frame is constructed to extend away from each pontoon into the body of water so that the frame attaches between and connects the pontoons. A tank is constructed to attach to the frame. A brush assembly is constructed to attach to the pontoons such that the brush assembly extends between the pontoons in the body of water. The brush assembly is also shaped to clean a boat hull, such as a V-hull. A nozzle assembly is constructed to attach to the pontoons and extend away from the pontoon into the body of water. The nozzle assembly is shaped to clean the exterior of the boat.

In some embodiments, the entire system floats on the water. In other embodiments, the frame is anchored to the ground in the body of water. In yet other embodiments, the system is configured for use on a boat ramp. Numerous variations and embodiments will be apparent in light of the present disclosure.

Overview

Fouling occurs when organic particles such as bacteria or plant matter from a body of water accumulate on the exterior of a boat. If fouling is not removed, it can allow invasive species and harmful microorganisms to travel on the exterior of the boat to different parts of a body of water or to another body of water that a user takes the boat to. This is harmful to these aquatic environments as invasive species and undesirable microorganisms are allowed to spread.

A user can clean the exterior of the boat by hand using a washing mitt or cloth, but this can be difficult and time consuming. Additionally, if fouling is left to accumulate over a period of time, it can become strongly attached to the exterior of a boat and difficult to remove by hand. The user may be required to use a pressure washer or other tool to remove the fouling. In either case, the cleaning process is manual and requires undesirable labor. Existing cleaning processes also require a user to remove the boat from the water which takes away from the time that the boat can be used and enjoyed in the water. For these reasons, a user may forget or neglect to clean the exterior of the boat and allow fouling to accumulate. Accumulated fouling can lead to negative environmental impacts as mentioned above. Accumulated fouling can also lead to damage to the exterior of a boat. Additionally, accumulated fouling can increase the drag on the exterior of a boat when used in water, leading to increased fuel consumption.

In light of the foregoing challenges, a need exists for an improved system for boat washing. The present disclosure addresses this need and others by providing an in-water boat wash system. In some embodiments, the in-water boat wash system enables automatic washing and filtration of the water used to wash the boat so as to remove particles greater than a predefined size, such as 5 microns. As such, the system can be useful to remove invasive species from the hull of a boat and aid in preventing the spread of such plant life from one location to another. In some embodiments, the system can be powered by solar panels. Numerous variations and embodiments will be apparent from the present disclosure.

Example Embodiments

Figure 2:
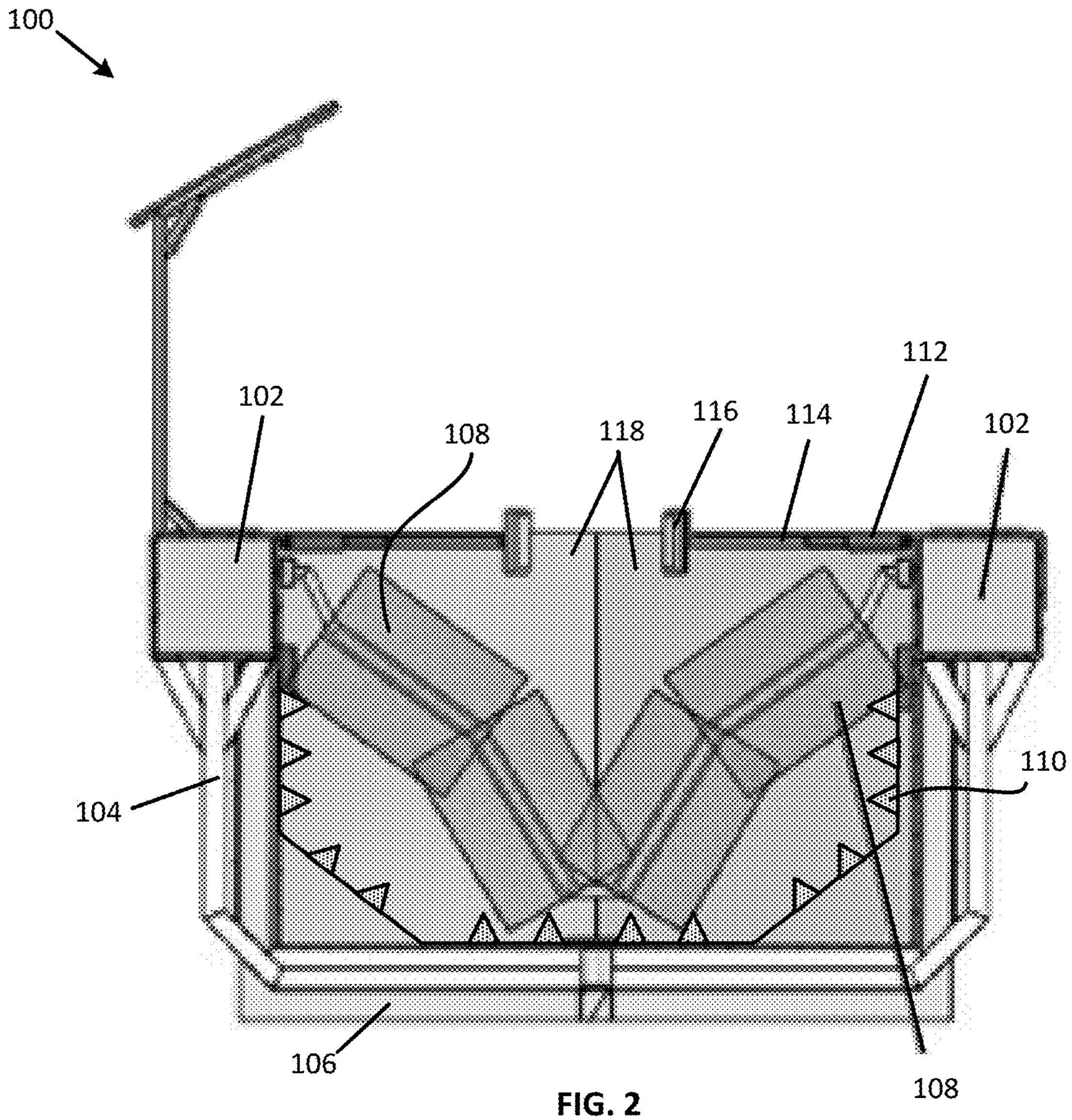
FIG. 2 is a cross-sectional view of the in-water boat wash system of FIG. 1.

FIG. 1 is a top perspective view of an in-water boat wash system 100 and FIG. 2 is a cross-sectional view of a boat was system 100, in accordance with some embodiments of the present disclosure. The boat wash system 100 includes pontoons 102 supported on a support structure or frame 104, and a tank 106 between the pontoons 102, among other components. Pontoons 102 are constructed to float in a body of water in a spaced-apart, parallel orientation so that the pontoons 102 define a support structure for the system 100 on a body of water. The pontoons 102 can be made of aluminum, steel, or polyurethane, for example. The pontoons 102 can have welded seams. The welded seams can allow the pontoons 102 to be watertight so that they remain afloat.

A frame 104 is constructed to extend downward and away from each of the pontoons 102 into the body of water. In some embodiments, the frame 104 includes a plurality of vertical support posts that extend vertically downward from each pontoon 102. The posts can extend to the ground, to footings, or can simply extend downward into the water to guide and contain the tank 106. In some embodiments, the frame 104 includes lateral sections that extend between and connect the vertical support posts and to generally define a U-shape below the spaced-apart pontoons 102. The frame 104 can be welded to the pontoons 102. Alternately, the frame 104 can be attached to the pontoons 102 with fasteners such as bolts or screws. The pontoons 102 can have brackets that are constructed to attach the frame 104 to the pontoons 102. In some embodiments, two or more distinct frames 104 can be attached to each pontoon 102. In some embodiments, the frame 104 can be constructed to define passageways for wiring, such as an opening or channel near the center of the frame 104. Such wiring channels can be used to connect power wires or low voltage communication wires. In one embodiment, a first end of the frame 104 is constructed to attach to one pontoon 102, and a second end of the frame 104 is constructed to attach to a second pontoon 102. In some embodiments, the frame 104 can define a rectangular profile, a V-shaped profile, or a U-shaped profile that is below the pontoons 102.

A basin or tank 106 is constructed to attach to be at least partially contained within the frame 104. The tank 106 can be made of a polymer. The tank 106 can be attached to the frame 104 with fasteners such as bolts or screws. The tank 106 can be constructed to keep water from inside the tank 106 from flowing into the body of water surrounding the tank 106. In some embodiments, the tank 106 has a bottom surface 106*a* that rests on the lateral sections of the frame 104 and includes sidewalls 106*b* that extend vertically up from the bottom surface 106*a*. Ends of the tank 106 can be selectively closed by doors 118 that swing open and closed. In the closed position, the doors 118 contain a volume of water used for a wash cycle and separate that water from the surrounding environment.

A brush assembly 108 is constructed to be attached to the pontoons 102 such that the brush assembly extends downward and away from the pontoons 102 and into the tank 106. The brush assembly 108 can be attached by welding or fasteners such as bolts or screws. The brush assembly 108 is shaped to clean the exterior of a boat hull that is submerged in the body of water. The brush assembly 108 can include a frame that one or more rotating brushes can be attached to. The frame can be shaped so that the brushes on the frame align with the shape of the boat hull in the in-water boat wash system 100. In one embodiment, the brush assembly 108 includes side brushes and a bottom brush for flat-bottom boats. In another embodiment, the brush assembly 108 includes brushes selected to conform to a V-hull or the like. In some embodiments, each of the rotating brushes has a diameter of at least 36 inches. The brush assembly 108 can engage and clean a boat hull by moving along a travel rail 109 along each of the pontoons 102 that guides longitudinal movement of the brush assembly 108 in a direction parallel to the pontoons 102 so as to clean a bottom of a boat.

A nozzle assembly 110 is provided in the tank 106 and includes a plurality of nozzle heads to direct pressurized water at the boat hull. The nozzle assembly 110 can include a frame that one or more nozzles can be attached to. The frame can be shaped so that the flow of water from the nozzles on the frame is directed at the exterior of a boat in the in-water boat wash system 100. In some embodiments, the nozzle assembly 110 is conformable so that it can take the shape of a boat hull. In some embodiments, the nozzle assembly 110 generally follows the profile of the tank 106. The nozzle assembly 110 can include two or more nozzle portions, each of which is configured to direct pressurized water towards a specific portion of a boat 500.

In some embodiments, the pontoons 102 define one or more access hatches 302. In some embodiments, a solar panel 205 can be attached to one or both pontoons 102.

The boat wash system includes arms 114 with contact pads 116 at the end of each arm 114, where the arms can be moved by way of an actuator 112. In use, arms 114 extend to engage a boat 500 located in the tank 106. Actuators 112 move the arms 114 to center and align the boat 500 in the tank 106, such as with the boat's keel aligned along the center of the tank 106.

Figure 3:
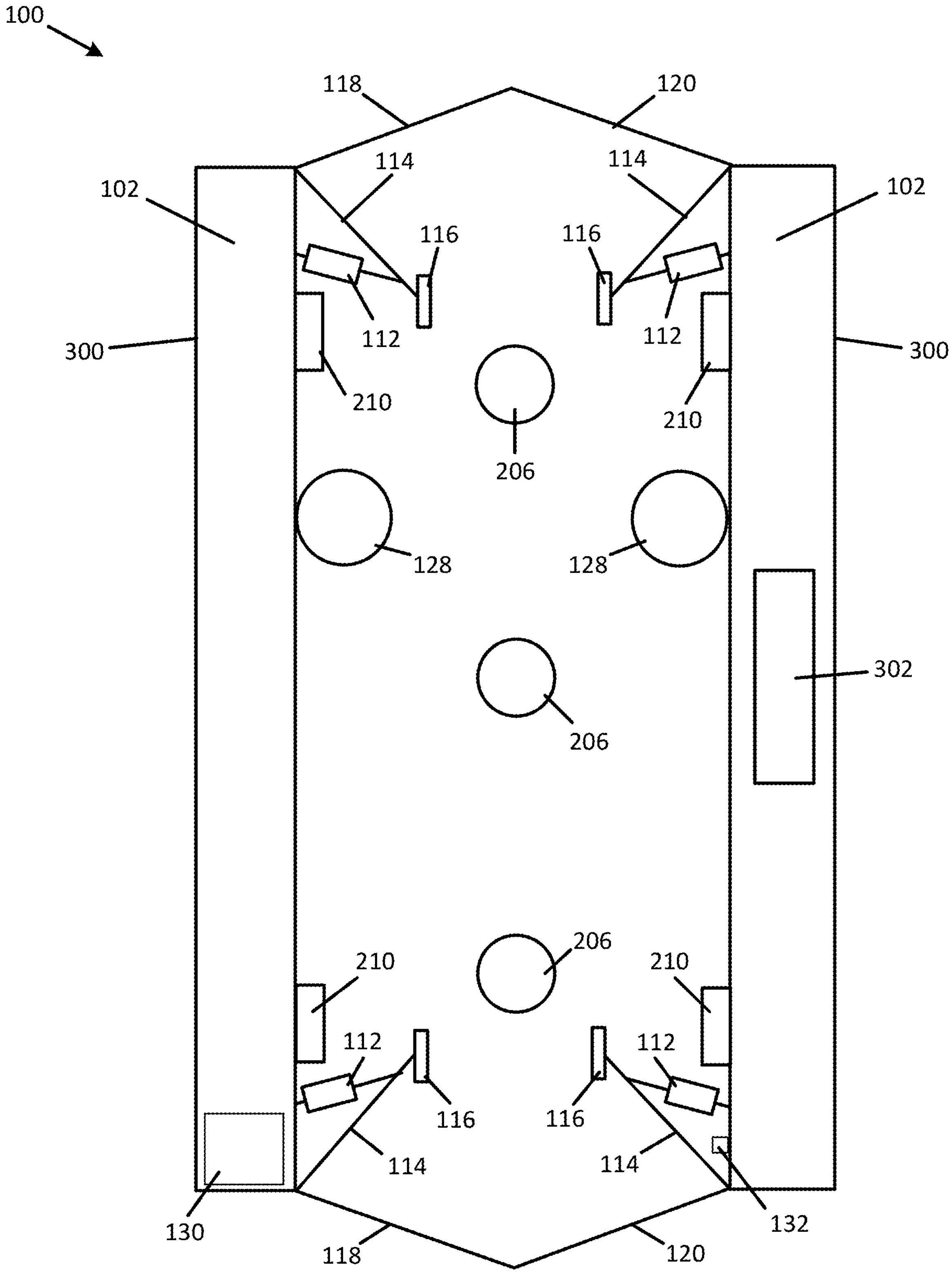
FIG. 3 is a top plan view of an in-water boat wash system, in accordance with an embodiment of the present disclosure.

FIG. 3 is a top plan view of the in-water boat wash system 100, in accordance with an embodiment of the present disclosure. An actuator 112 can be pivotably attached to the pontoon 102. An arm 114 can be moved by the actuator 112. When the actuator 112 is actuated, it can move the arm 114 away from the pontoon 102 and towards a boat hull. The arm 114 can have an end configured as a contact pad 116 that is constructed to contact the boat hull. In some embodiments, the contact pad 116 is constructed to hold a boat in place without causing damage to the exterior of the boat. The contact pad 116 can include a soft coating such as rubber foam and/or cloth. A pressure sensor can also be included in the contact pad 116 to ensure that the exterior surface of the boat 500 is being held with an appropriate amount of pressure to keep the boat in place, but without causing damage to the exterior.

The in-water boat wash system 100 can include one or more rotating brushes 128 attached to the pontoons 102, to the tank, or to the frame 104. For example, rotating brushes 128 extend up from the bottom of the tank 106. Each rotating brush 128 can be shaped and arranged to clean the exterior of a boat above water. Each brush 128 can improve cleaning of the water scrum line.

One or more doors 118, such as a pair of gate doors 118, can extend between and are pivotably attached to the spaced-apart pontoons 102. For example, gate doors 118 can be pivotably attached to the pontoons 102 by hinges. The gate doors 118 can be made of polypropylene, fiberglass, aluminum, or steel. The gate doors 118 are shaped to come together when closed and close an entrance to the tank 106 and provide little or no exchange of water through the doors 118. In a closed position, the gate doors 118 can extend at angle of 20-60 degrees, such as 45 degrees, from respective ends of the pontoons 102. Alternatively, in a closed position, the gate doors 118, 120 can extend perpendicularly the pontoons 102. The gate doors 118 can each have a seal at the end where the gate doors 118 meet. The seal can be made of rubber. The gate doors 118 can use a hydraulically or pneumatically operated opening mechanism so that the doors 118 can be opened remotely by a user. In other embodiments, the system 100 can have a single gate door 118 at each end of the system, namely, at an entrance and at an exit.

A kiosk 130 can be configured to be in electronic communication with gate doors 118, the brush assembly 108, and the nozzle assembly 110. The kiosk 130 can use an RFID system or a mobile app configured so that a user can start the washing process remotely. The kiosk 130 can communicate with the hydraulically or pneumatically operated opening mechanism of the gate doors 118 to open or close the gate doors 118 when a user starts or stops the washing process. The kiosk 130 can communicate with the brush assembly 108 and the nozzle assembly 110 to start operation of the brush assembly 108 and nozzle assembly 110 after a boat has entered the tank 106 and all doors 118 are closed.

A sensor 132 can be arranged and configured to detect a boat in the tank 106 of the boat wash system 100. The sensor can be located on one or both pontoons 102. The sensor 132 can be located on a side of the pontoon 102 where the boat enters the in-water boat wash system 100. The sensor can communicate with the kiosk 130 by wired or wireless means. The sensor 132 can be configured to measure a dimension of a boat such as the length or width of the vessel. The sensor 132 can be configured to detect a position of the boat within the in-water boat wash system 100, such as a distance from each of the pontoons 102. The kiosk 130 can be configured to stop operation of the boat wash system 100 if the boat is not positioned correctly to be washed by the brush assembly 108 and/or the nozzle assembly 110.

Figure 4:
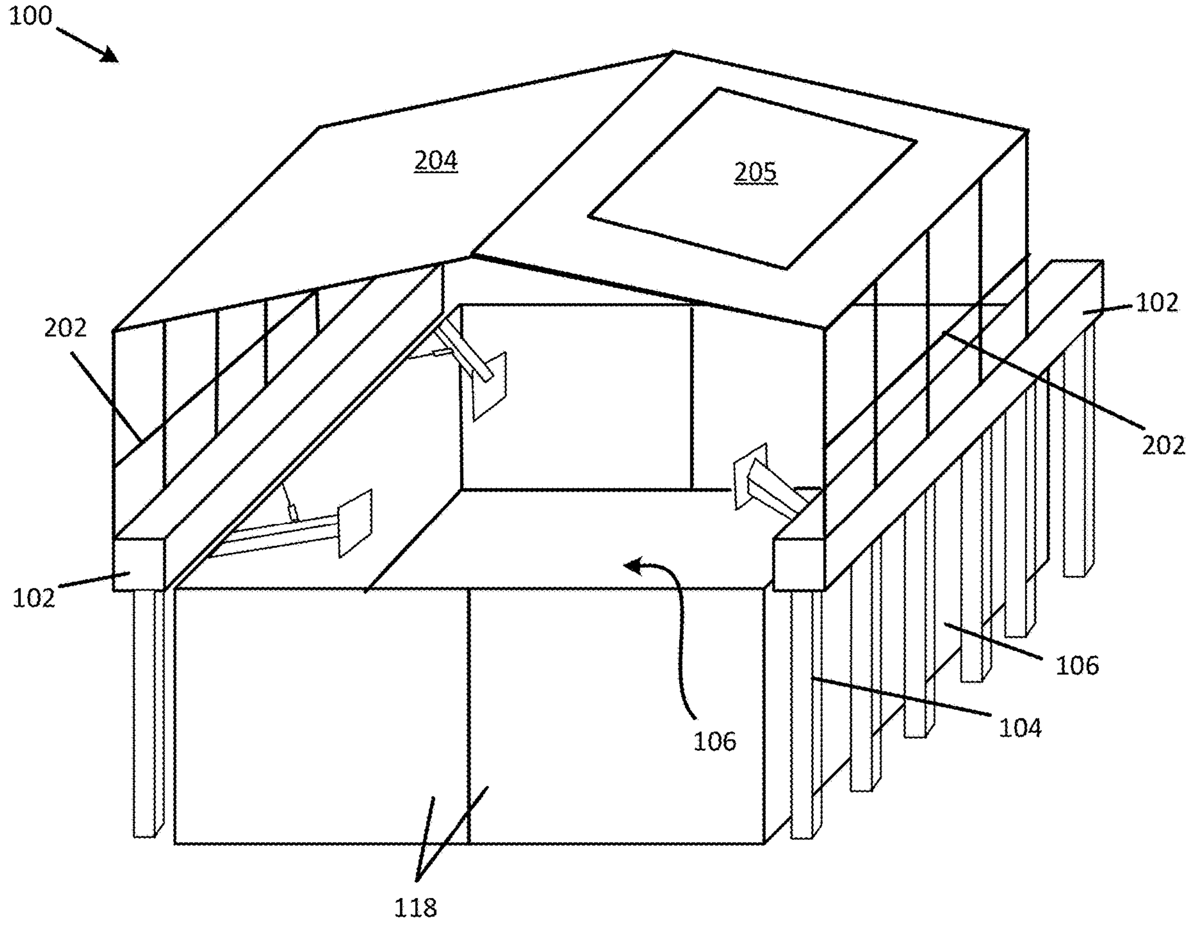
FIG. 4 illustrates an in-water boat wash system with a railing, in accordance with an embodiment of the present disclosure.

FIG. 4 illustrates a perspective view of an boat wash system 100 with a railing 202 on top of the pontoons 102, in accordance with an embodiment of the present disclosure. The railing 202 can be configured to attach to a top side of one or both pontoons 102. The railing 202 can be attached to an outer edge of the pontoon 102. The railing 202 can be four feet in height or other suitable height. In one embodiment, the railing 202 has circular brackets configured to receive posts that will be removable to support a roof 204. In one example, the roof 204 can be eight feet off of deck on exterior sides that are bent to an angle of 0-45 degrees. The roof 204 can also include a solar panel 205 used to power, at least in part, the wash system 100. In one example, a solar battery bank with inverter can be held in one or both of the pontoons 102. One or both pontoons 102 can also be configured to hold washing equipment, hydraulic equipment, and power distribution panels. Pontoons 102 can be charged using power hookups on land and can also be configured to operate from an on-land power supply by means of a NFPA 72 connection.

Figure 5:
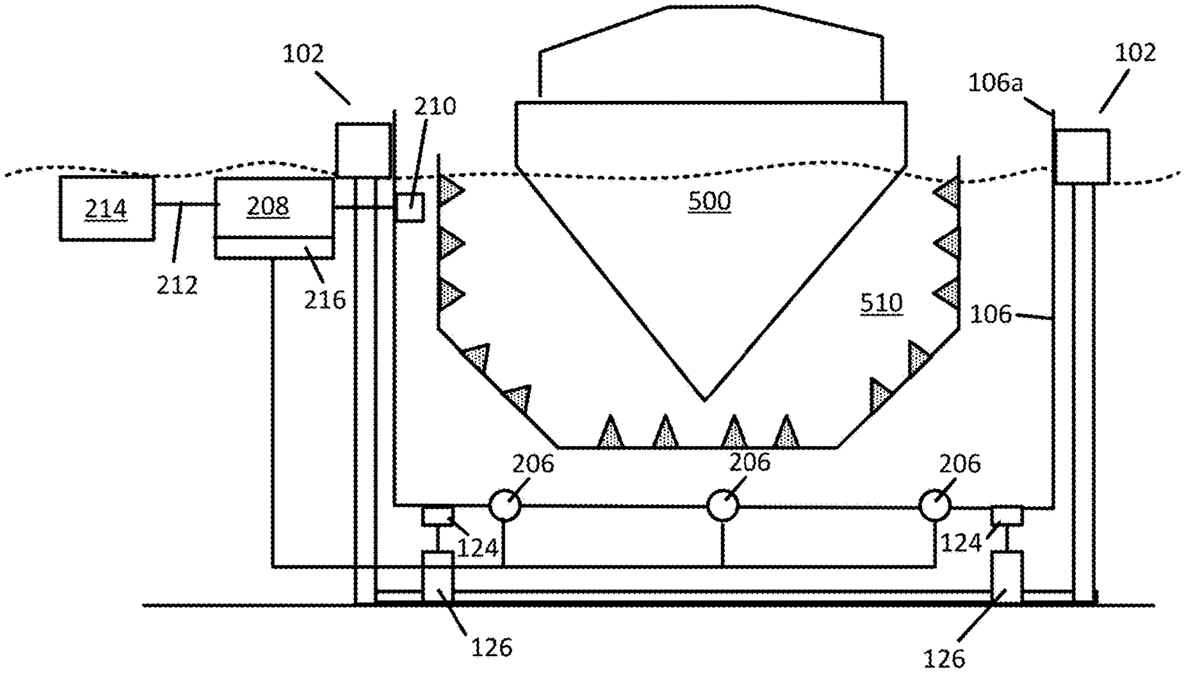
FIG. 5 illustrates a side perspective view of an in-water boat wash system submerged in a body of water, in accordance with an embodiment of the present disclosure.

FIG. 5 illustrates an end view of an in-water boat wash system 100 submerged in a body of water together with a boat 500, in accordance with an embodiment of the present disclosure. The tank 106 can have one or more intake ports 206 on a bottom portion of the tank 106. The intake ports can be configured to be in fluid communication with a filter 208. The filter system 208 can be configured to remove debris from the water received by the intake port 206. Debris can be bacteria, plant matter, animal waste, other organic matter in a body of water, or non-organic particles in a body of water. The filter system 208 can be configured to filter particles greater than 5 microns from a body of water. The filter system 208 can be a remote-located model that is configured to handle a high flow rate, such as about 20,000 to 160,000 gallons of water wash cycle in about 15 minutes. An oil separator tank 216 can also be included in the filter system 208. A discharge port 210 on the pontoon can be configured to discharge filtered water from the filter system 208 back into the tank 106. A discharge line 212 can be configured to receive debris from the filter system 208. The discharge line can be connected to a discharge tank 214. The discharge tank 214 can be constructed to receive and hold debris from the discharge line 212. The discharge tank 214 can then be emptied by a pump-out vessel or a commercial sewage company. Alternatively, the discharge line 212 can be constructed to connect to a sewage system or leach field after water travels through the oil separator tank 216.

Beams 124 can extend longitudinally along a bottom side of the tank 106. A piston 126 can be configured to attach each beam 124. The piston(s) 126 can be configured to raise the tank 106 above the water level of a body of water by pushing upwards on the beam 124. The tank can include two or more beams 124 and the pistons 126 can lift the tank 124 up so that the top 106*a* of the tank 106 is out of the water. Alternately, the pistons 126 can raise the tank 106 so it is completely out of the water. In one embodiment, after a boat 500 enters the wash system 100, pistons 126 raise the tank 124 to enclose the boat 500 and water 510 surrounding the boat, thereby separating the volume of water 510 immediately surrounding the boat 500 from the remaining body of water. During the wash cycle, water from within the tank 106 is filtered by the filter system 208. After completing a wash cycle, the tank 106 lowers, by action of the pistons 126, to allow the boat 500 to pass freely to the body of water.

Figure 6:
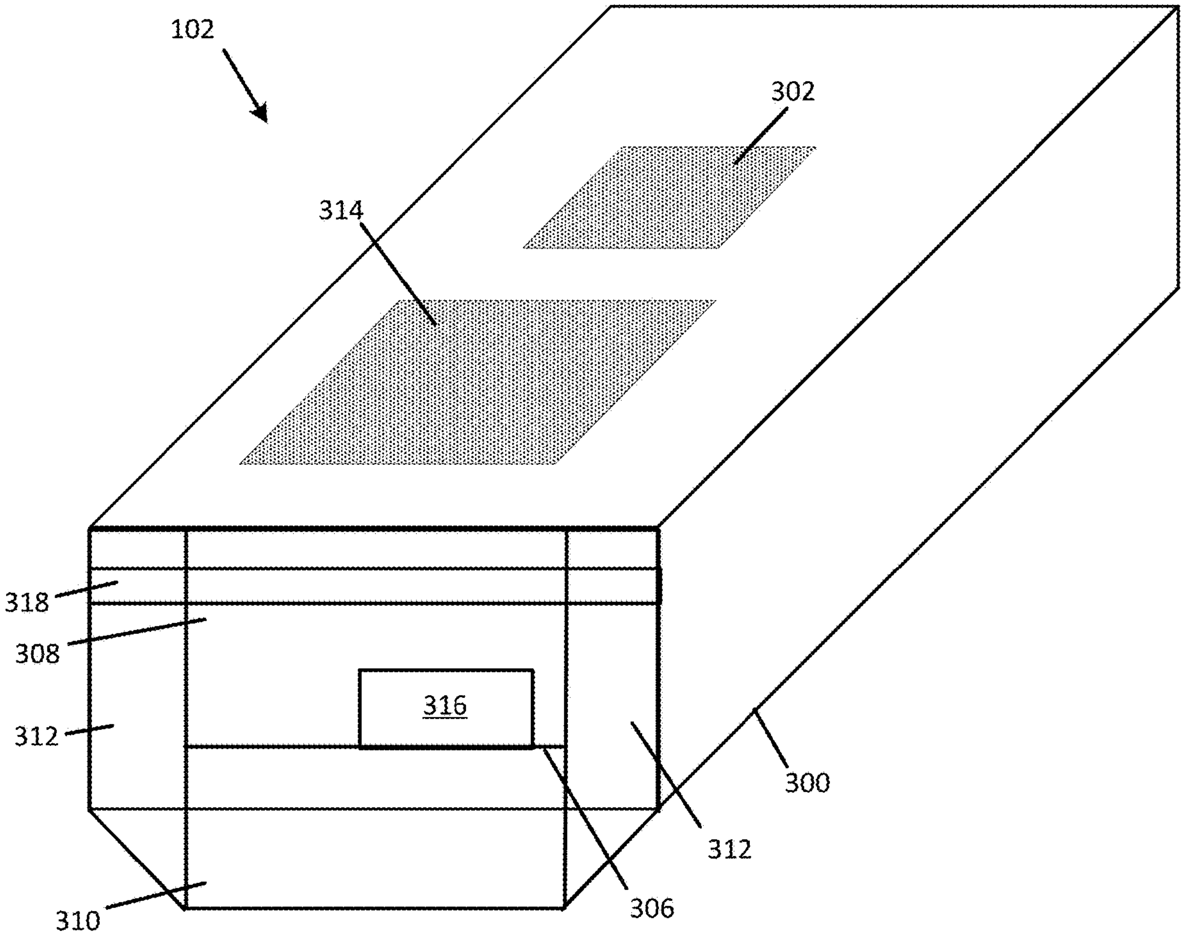
FIG. 6 illustrates a pontoon, in accordance with an embodiment of the present disclosure.

FIG. 6 illustrates a perspective view of a pontoon 102, in accordance with an embodiment of the present disclosure. The pontoon 102 can include outer walls 300 that define an inner volume 304. In one example, the pontoon 102 can be four feet in width and/or four feet in height. The pontoon 102 can be twenty, thirty, forty feet, fifty, fifty-five, sixty, or seventy feet long, for example. The pontoon 102 can be shaped as a rectangular prism. A cross section of a bottom section of the pontoon 102 can be V-shaped in some embodiments. In other embodiments, the pontoon 102 has a cylindrical geometry. The outer walls 300 can be made of aluminum, steel, or polypropylene, for example. The outer walls 300 can have welded seams. A partition 306 can divide the inner volume 304 into a first section 308 and a second section 310. The first section 308 can be arranged to be above the second section 310. The first section 308 can be constructed to hold equipment such as hydraulic equipment for the brush assembly 108, and pumps for the nozzle assembly 110. The second section can be configured as a sealed air chamber for flotation and/or for operation of pneumatic systems, or configured to contain waste tanks, in some embodiments. The bow and stern portions of the pontoon 102 can include foam or other buoyant material for purposes of flotation.

A solar panel 314 can be included on a top of the pontoon 102. The first section 308 can be constructed to hold a battery 316 for the solar panel 314 or 205. The partition 306 can form a floor of the first section 308 and can be constructed to hold equipment such as hydraulic equipment for the brush assembly 108 or the nozzle assembly 110, or a battery 316 for a solar panel 314 or 205, or shore power hookups. An access hatch 302 can be arranged on the outer wall 300 to allow access to the first section 308. The hatch 302 can be water-tight to allow equipment to be stored inside the pontoon.

The second section 310 can be constructed to be filled with a buoyant substance, such as air or foam. A buoyant substance is one that will allow the pontoon to float in water when used to fill a section of the pontoon. The second section 310 can be airtight to prevent air or gas from escaping. The second section 310 can be watertight to prevent water from entering. A side space 312 can be included adjacent to the first and second sections. The side space 312 can be constructed to be filled with a buoyant substance. The side space 312 can be airtight to prevent air or gas from escaping. The side space 312 can be watertight to prevent water from entering.

Figure 7:
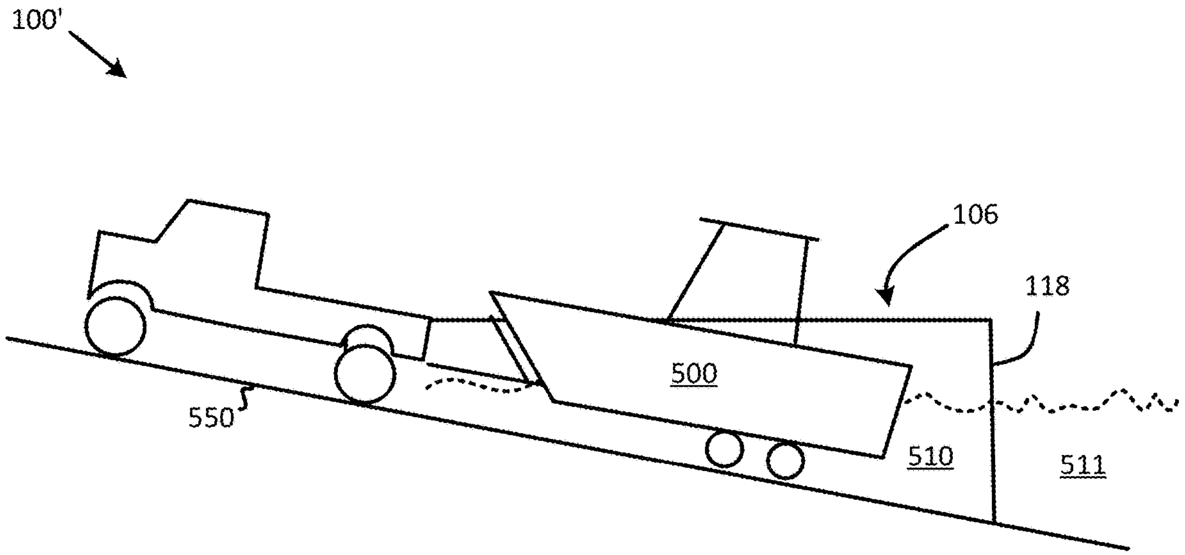
FIG. 7 illustrates a side view of a boat was system for use on a boat ramp, in accordance with an embodiment of the present disclosure.

FIG. 7 illustrates a side view of a boat wash system 100' configured for use on a boat ramp 550, in accordance with an embodiment of the present disclosure. In this example, a front or uphill side of the boat wash system 100' remains open so that a trailered boat can be placed into the tank. The downhill side of the boat wash system 100' includes one or more doors 118 that can open to close the volume of water 510 in the tank 106 to the outside water 511. Instead of floating pontoons, the boat wash system 100' can use pontoon-like structures to store mechanical components of the system, such as pumps, electrical connections, hydraulics, and pneumatic systems.

In use, the captain can enter the boat wash system 100' located on a boat ramp 550. After the boat is in the tank 106, the boat wash system 100' begins operation to clean the hull of the boat 500. A trailer can then be backed into the tank 106 to load the boat 500, which is now clean of aquatic life, dirt, and the like.

In a method of using an in-water boat wash 100, gates of the system open to allow a boat to enter the tank. After the boat proceeds into the tank and has cleared the open door, the doors close to define a closed volume of water in the tank. Arms extend to engage the boat hull and align the boat with the tank 106. In some embodiments, arms communicate with the system to determine position and pressure applied to the boat hull. After closing the gates, the filtration system starts and rotating brushes begin to rotate. In some embodiments, the nozzle assembly sprays the bottom of the boat in conjunction with rotating brushes engaging the boat. A pump system exchanges the volume of water in the tank, filtering particles and solids from the water that have a size greater than a predefined threshold size, such as 5 microns. In some embodiments, the filtration system takes in water at or near the bottom of the tank 106 and returns water back into the tank after passing through a filter. In some embodiments, the wash cycle includes injecting a cleaning material (e.g., soap, chemicals, herbicide) into the return water stream. Optionally, the system is equipped with a pressure washing nozzle that is available to the user to spray other portions of the boat that are not accessed by the nozzle assembly and brush assembly. Optionally, the system includes a vacuum available to the user for cleaning the top and inside of the boat. At the completion of the wash cycle, the filter system ramps down (e.g., to 5% water flow) or shuts off completely, the arms retract from the sides of the boat, and the exit gates open to allow the boat to exit the tank. The captain may be signaled to enter, wait, and/or exit at various portions of the wash cycle.

Further Example Embodiments

Example 1 is a boat wash system comprising pontoons constructed to float in a body of water, a frame constructed to attach to the pontoons such that the frame extends down and away from the pontoons, and a tank constructed to be retained by the frame. A brush assembly is constructed to attach to the pontoon such that the brush assembly extends away from the pontoon into the body of water, where the brush assembly is shaped to clean the exterior of a boat. A nozzle assembly is constructed to attach to the pontoon such that the nozzle assembly extends away from the pontoon into the body of water, the nozzle assembly shaped to clean the exterior of the boat.

Example 2 includes the boat wash system of Example 1, wherein the frame is constructed to hold wiring.

Example 3 includes the boat wash system of Example 1 and further comprises an actuator constructed to be pivotably attached to the pontoon and an arm constructed to be moved by the actuator, wherein the arm is configured to contact an exterior of a boat to secure a boat in place.

Example 4 includes the boat wash system of Example 1 and further comprises a bar configured to be attached to a bottom side of the tank and a piston configured to be attached to the bar, the piston being configured to raise the tank above a water level.

Example 5 includes the boat wash system of Example 1, further comprising a side brush configured to be attached to the pontoon, wherein the side brush is shaped and arranged to clean the exterior of a boat above water.

Example 6 includes the boat wash system of Example 1 and further comprises a second pontoon constructed to float in the body of water, wherein the frame is constructed to attach to the second pontoon such that the frame extends away from the second pontoon into the body of water.

Example 7 includes the boat wash system of Example 6 and further comprises a first gate door configured to be pivotably attached to the pontoon and a second gate door configured to be pivotably attached to the second pontoon. The first and second gate doors are shaped to meet and close an entrance to the tank.

Example 8 includes the boat wash system of Example 7 and further comprises a kiosk configured to be in electronic communication with the first and second gate doors, the brush assembly, and the nozzle assembly.

Example 9 includes the boat wash system of Example 8 and further comprises a sensor arranged and configured to detect a boat, wherein the sensor is in electronic communication with the kiosk.

Example 10 includes the boat wash system of any of the foregoing Examples and further comprises a railing configured to attach to a top side of the pontoon and the second pontoon, and a roof supported by the railing.

Example 11 includes the boat wash system of Example 10, further comprising a solar panel on the roof.

Example 12 includes the boat wash system of any one of the foregoing examples and further comprises an intake port on a bottom side of the debris tank configured to be in fluid communication with a filter, wherein the filter is configured to remove debris from water. A discharge port is on the pontoon configured to discharge filtered water from the filter. A discharge line configured to receive debris from the filter.

Example 13 includes the boat wash system of Example 12 and further comprises a discharge tank constructed to receive and hold debris from the discharge line.

Example 14 includes the boat wash system of Example 12 or 13 and further comprises an oil separator tank.

Example 15 is a pontoon comprising outer walls defining an inner volume and having a partition that divides the inner space into a first section and a second section.

Example 16 includes the pontoon of Example 15, wherein the second section is constructed to be filled with a buoyant substance.

Example 17 includes the pontoon of Example 15, wherein the outer walls are shaped as a rectangular prism.

Example 18 includes the pontoon of Example 15 and further defines a space adjacent to the first and second section on the side, wherein the space is constructed to be filled with a buoyant substance.

Example 19 includes the pontoon of Example 15 and further comprises an access hatch on the outer walls arranged to allow access to the first section.

Example 20 includes the pontoon of Example 15 and further comprises a solar panel on an upper wall of the outer walls and a battery in the first section, the battery being configured to be charged by the solar panel.

The invention claimed is:

1. An in-water boat wash system comprising:

at least one pontoon constructed to float in a body of water;

a frame attached to the at least one pontoon such that the frame extends into the body of water;

a tank configured to attach to the frame such that the tank extends into the body of water, the tank comprising side walls and at least one gate;

a brush assembly comprising at least one brush housed within the tank;

a nozzle assembly comprising at least one nozzle head attached to the tank;

a sensor assembly comprising at least one sensor configured to detect an object in the tank;

a control kiosk in electronic communication with the at least one sensor, the at least one gate, the brush assembly, and the nozzle assembly, wherein the control kiosk is configured to initialize a cleaning cycle; and at least one travel rail coupled to the brush assembly, wherein the brush assembly is configured to travel along the at least one travel rail during the cleaning cycle.

2. The in-water boat wash system of claim 1, further comprising:

an actuator, operatively coupled to the control kiosk, pivotably attached to at least one of: the pontoon or the tank; and an arm moveably attached to the actuator, wherein the arm is configured to secure a boat in place.

3. The in-water boat wash system of claim 1, wherein the control kiosk is in electronic communication with an RFID system configured to identify one or more known boats when in proximity to the in-water boat wash system.

4. The in-water boat wash system of claim 1, wherein the control kiosk is in electronic communication with at least one mobile app, the mobile app configured to allow a user to remotely initialize a cleaning cycle.

5. The in-water boat wash system of claim 1, further comprising a piston attached to the frame and contacting the base of the tank, wherein the piston is configured to raise the tank above a water level.

6. The in-water boat wash system of claim 1, further comprising an intake port on the base of a debris tank in fluid communication with a filter, wherein the filter is configured filter out debris from water.

7. The in-water boat wash system of claim 6, further comprising a discharge port configured to discharge filtered water from the filter back into the tank.

8. The in-water boat wash system of claim 6, further comprising a discharge line configured to discharge the filtered-out debris into a holding tank.

9. The in-water boat wash system of claim 6, wherein the filter includes a 5-micron filter.

10. The in-water boat wash system of claim 1, further comprising an intake port on the base of the debris tank, the intake port in fluid communication with an oil separator tank configured to separate oil from the water.

11. The in-water boat wash system of claim 1, wherein the sensor assembly comprises at least one of an infrared sensor and an ultrasonic sensor.

12. The in-water boat wash system of claim 1, wherein the brush assembly further comprises at least one of:

a plurality of side brushes and a bottom brush configured for a flat-bottom boat; and a plurality of angled brushes configured for a V-hull boat.

13. The in-water boat wash system of claim 1, further comprising one or more rotating brushes attached to the tank base and extending vertically upward.

14. The in-water boat wash system of claim 1, wherein the at least one pontoon comprises an interior partition dividing the at least one pontoon into a first section and a second section, wherein the first section is configured as storage and the second section contains a buoyant substance.

15. The in-water boat wash system of claim 14, further comprising at least one hatch configured to allow access to the first section of the at least one pontoon.

16. The in-water boat wash system of claim 1, further comprising:

a battery bank in electronic communication with the control kiosk, the brush assembly, the sensor assembly, and at least one pump associated with the nozzle assembly; and a solar panel in electronic communication with the battery bank.

17. The in-water boat wash system of claim 1, further comprising:

a railing attached to at least one of: the at least one pontoon or the frame; and a roof attached to the railing.

18. The in-water boat wash system of claim 1, further comprising a de-icing assembly in electronic communication with the kiosk.

19. The in-water boat wash system of claim 1, wherein the at least one pontoon is made of at least one: of aluminum, steel, or polypropylene, and wherein the tank is made of at least one of: aluminum or polymer.

* * * * *